United States Patent Office

2,825,734
Patented Mar. 4, 1958

2,825,734

REDUCTION OF CARBONYLIC RADICALS IN INDOLYL-3 COMPOUNDS

Merrill E. Speeter, Kalamazoo Township, Kalamazoo County, Mich., assignor to The Upjohn Company, Kalamazoo, Mich., a corporation of Michigan No Drawing. Application April 11, 1955
Serial No. 500,660

21 Claims. (Cl. 260—319)

The present invention relates to a novel process for the preparation of 1-dehydro-3-(2-amino-1-hydroxyethyl)-indoles and to the novel compounds produced therein. More particularly, the invention is concerned with the reduction of 1-dehydro-3-indoleglyoxylamides and 1-dehydro-3-indoleglycolamides with lithium aluminum hydride to produce the novel 1-dehydro-3-(2-amino-1-hydroxyethyl)-indoles and to novel 1-dehydro-3-indoleglyoxylyl halides, 1-dehydro-3-indoleglyoxylamides, and 1-dehydro-3-indoleglycolamides useful therein. The term "dehydro" is used to denote the absence of hydrogen in the 1-position of the indole nucleus in contrast to a 1-hydroindole.

It is known that 1-hydro-3-indoleglyoxylic acid esters can be reduced with aluminum amalgam (Baker, J. Chem. Soc. 1940, 458–60), but in the disclosed Baker process the ring-attached carbonyl group is reduced only to a carbinol group and the carboxylic carbonyl is not reduced at all. Thus when Baker reduced 1-hydro-3-indoleglyoxylic acid esters (the methyl or ethyl ester) with aluminum amalgam, he obtained the corresponding 1-hydro-3-indoleglycolate. It is known also that certain glyoxylic acids can be reduced with lithium aluminum hydride. By this process, however, the corresponding ethylene glycol is obtained. Thus phenylglyoxylic acid was reduced by Nystrom et al., J. Am. Chem. Soc. 69, 2548–9 (1947) to phenylethylene glycol.

It has now been found that 3-indoleglyoxylamides react with lithium aluminum hydride in an entirely unexpected manner. Thus when the 3-indoleglyoxylamides are unsubstituted in the 1-position, i. e., are 1-hydro-3-indoleglyoxylamides, the carboxylic carbonyl group and the ring-attached carbonyl group are reduced to methylene groups to produce 3-(2-aminoethyl)-indoles (tryptamines), but when the 3-indoleglyoxylamides are substituted in the 1-position, i. e., are 1-dehydro-3-indolegly-oxylamides, the carboxylic carbonyl group is completely reduced to a methylene group and the ring attached carbonyl group is reduced to a carbinol group to produce 1-dehydro-3-(2-amino-1-hydroxyethyl)-indoles.

It has been further found that 3-indoleglycolamides react with lithium aluminum hydride in a like anomolous manner. Thus with 1-hydro-3-indoleglycolamide, the carboxylic carbonyl group as well as the carbinol group is reduced to methylene groups, but with 1-dehydro-3-indoleglycolamides, the carboxylic carbonyl group is reduced to a methylene group and the carbinol group remains intact.

The process to which the present invention is directed, namely, the preparation of 1-dehydro-3-(2-amino-1-hydroxyethyl)-indoles, is applicable to any 1-dehydro-3-indoleglyoxylamide and 1-dehydro-3-indoleglycolamide. The indole nucleus, other than the 1 and 3 position, can be substituted or unsubstituted. Substituents reducible with lithium aluminum hydride under the conditions of the present invention are usually undesirable unless the reduced form of the substituent is desired in the final product.

It has been further found in accordance with the present invention that the desired 1-dehydro-3-(2-amino-1-hydroxyethyl)-indoles, wherein the 1-substituent is alkyl or aralkyl, can be obtained in high yield by converting a 1,3-dihydroindole to a 1-alkyl or 1-aralkyl-3-hydroindole (the 3-position has to be unsubstituted), subjecting the later to glyoxylation with an oxalyl halide to produce a 1-alkyl or 1-aralkyl-3-indoleglyoxylyl halide, converting the latter to an amide by reacting with ammonia or a primary or secondary amine, and reducing the resulting 1-alkyl or 1-aralkyl-3-indoleglyoxylamide with lithium aluminum hydride. By this process a 1,3-dihydroindole can be converted to the desired 1-alkyl or 1-aralkyl-3-(2-amino-1-hydroxyethyl)-indole in four simple steps, each of which gives a high yield. 1-aryl-3-(2-amino-1-hydroxyethyl)-indoles can also be prepared by subjecting a 1-aryl-3-hydroindole to glyoxylation with an oxalyl halide, amidating the resulting 1-aryl-3-indoleglyoxylyl halide with ammonia or a primary or secondary amine, and reducing the resulting amide with lithium aluminum hydride. 1-aryl-3-hydroindoles, e. g., 1-phenylindole, can be prepared by the Fischer synthesis. For example, Shirley et al., J. Am. Chem. Soc. 75, 375 (1953), describe the preparation of 1-phenylindole by the ring closure of the diphenylhydrazone of pyruvic acid followed by decarboxylation of the resulting 1-phenyl-2-indolecarboxylic acid.

An alternative process for the preparation of a 1-alkyl or 1-aralkyl-3-indoleglyoxylamide involves subjecting a 1,3-dihydroindole to glyoxylation with an oxalyl halide, converting the resulting 1-hydro-3-indoleglyoxylyl halide by amidation to a 1-hydro-3-indoleglyoxylamide, and thereupon converting the 1-hydro-3-indoleglyoxylamide to a 1-alkyl or a 1-aralkyl-3-indoleglyoxylamide.

Introduction of alkyl or aralkyl substituents at position 1 can be accomplished by the process described by Baker (loc. cit.), i. e., the desired 1-substituent can be introduced into a 1,3-dihydroindole before glyoxylation or into a 1-hydro-3-indoleglyoxylamide, as noted above. The Baker process involves reacting a 1-hydroindole with an alkyl halide in the presence of an alkali-metal alkoxide for the preparation of a 1-alkylindole. An aralkyl halide, e. g., benzyl chloride, can also be employed in the Baker process for the preparation of a 1-aralkylindole. Moreover, 1-alkyl or 1-aralkylindoles can also be prepared by the well known Fischer synthesis. Potts et al., J. Chem. Soc. 1954, 2641, and Plieninger, Ber. 87, 127 (1954) also describe the preparation of 1-substituted indoles.

A further modification of the process of the present invention involves the partial reduction of a 1-dehydro-3-indoleglyoxylamide to a 1-dehydro-3-indoleglycolamide by employing a reducing agent other than lithium aluminum hydride, e. g., sodium borohydride, and thereupon completing the reduction with lithium aluminum hydride to the desired 1-dehydro-3-(2-amino-1-hydroxyethyl)-indole.

For the purpose of more fully illustrating the present invention, the starting 3-hydroindoles, for the most part, can be represented by the following formula:

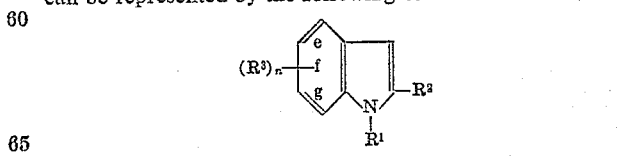

wherein $R^2$ advantagously contains not more than fifteen carbon atoms and represents hydrogen; an aryl radical, e. g., the radicals of the benzene and naphthalene series such as phenyl, naphthyl, and biphenylyl, lower-alkyl substituted phenyl and naphthyl such as tolyl and 2-methylnaphthyl, lower-alkoxy substituted phenyl and naphthyl such as methoxyphenyl and 2-ethoxynaphthyl, halogen substituted phenyl and naphthyl such as chlorophenyl, 2-chloronaphthyl, and the like; an aralkyl radical, e. g., benzyl, phenethyl, haloaralkyl such as para-chlorobenzyl, alkylaralkyl such as para-ethylbenzyl, alkoxyaralkyl such as para-methoxybenzyl, and the like; or a lower-alkyl radical containing up to and including eight carbon atoms, e. g., methyl, propyl, octyl, and the like. $R^1$ represents hydrogen; an alkyl radical containing up to twenty carbon atoms such as methyl, ethyl, propyl, hexyl, decyl, hexadecyl, and the like; an aryl radical containing up to fifteen carbon atoms such as phenyl, naphthyl, biphenylyl, para-chlorophenyl, 2-ethoxynaphthyl, and the like; or an aralkyl radical containing up to fifteen carbon atoms such as benzyl, phenethyl, phenylbutyl, halobenzyl, such as para-chlorobenzyl, alkylbenzyl, such as para-methylbenzyl, alkoxybenzyl, such as para-methoxybenzyl, and the like. $R^3$ advantageously contains not more than fifteen carbon atoms and represents halogen, e. g., fluorine, chlorine, bromine, and iodine; a cyano radical; a carboxy radical; a lower-carbalkoxy radical, e. g., carbomethoxy, carbethoxy, carbobutoxy, and the like; a dialkylamino radical, e. g., dimethylamino, diethylamino, methylbutylamino, and the like; a lower-alkyl radical; an aryl radical; an aralkyl radical; an aryloxy radical, e. g., phenoxy, and the like; a lower-alkoxy radical, e. g., methoxy, isopropoxy, butoxy, and the like; a benzyloxy radical, e. g., benzyloxy, benzhydryloxy, alkylbenzyloxy, such as para-methylbenzyloxy and para,para'-dimethylbenzhydryloxy, halobenzyloxy, such as para-chlorobenzyloxy and para, para'-dichlorobenzhydryloxy, alkoxybenzyloxy, such as para-methoxybenzyloxy and para,para'-dimethoxybenzhydryloxy, and the like; an acyloxy radical wherein the acyl substituent is from an organic carboxylic acid containing from one to eight carbon atoms, e. g., formyloxy, acetoxy, propionoxy, benzoxy, and the like; and a fused arylene radical, e. g., phenylene, naphthylene, and the like. $n$ is an integer from zero to four, and when $n$ is greater than one the $R^3$'s can be alike or different. When $n$ is less than four, of course, it is understood that the remaining benzene-ring positions are not substituted. A fused arylene radical, as used herein, encompasses a divalent arylene radical which is fused at positions e, f, or g of the benzene ring of the indole nucleus.

It is to be understood, however, that the invention in its broadest aspects, is independent of the presence or absence of substituents on the benzene or pyrrole ring except, of course, that the 1-hydrogen must be replaced; also that the invention is independent of the particular group used to replace the 1-hydrogen as long as the 1-hydrogen is not regenerated by hydrogenolysis during the reduction. In all other respects the indole nucleus can be unsubstituted or substituted as desired by indifferent substituents, that is, substituents which are not affected by the reagents used in the process, or by reactive substituents, that is, substituents which are affected by the reagents used in the process. If a substituent is affected by a reagent used, it means only that the substituent on the product will be different from that on the starting compound and the only adverse effect is that more of the reagent will be required to effect the desired reduction in the 3-substituent group. Thus the indole nucleus can be substituted as desired without affecting the characteristic and desired reduction of the 3-substituent group in accordance with the invention.

The various substituted indoles employed in the preparation of the essential 3-indoleglyoxylyl halides can be prepared by one of the following procedures:

(1) The 4- and 5-acyloxyindoles are prepared in the manner disclosed by Beer et al. (J. Chem. Soc. 1948, 1605–9) in the preparation of 4- and 5-acetoxyindoles by utilization of the corresponding acylating agent. The 6- and 7-acyloxyindoles are prepared in the same manner utilizing 4-hydroxy-2-nitrobenzaldehyde (Sachs, Ber. 39, 2758), and 3-hydroxy-2-nitrobenzaldehyde (Hodgson et al., J. Chem. Soc. 1925, 877), respectively, as the starting compounds.

(2) The starting 4-, 5-, 6- and 7-benzyloxyindoles can be prepared by the following procedure:

(a) Benzylating 3-hydroxy-2-nitrobenzaldehyde, 4-hydroxy-2-nitrobenzaldehyde, 5-hydroxy-2-nitrobenzaldehyde (Beer et al., supra), 6-hydroxy-2-nitrobenzaldehyde (Beer et al., supra) with a benzyl halide such as benzyl chloride, to produce the corresponding benzloxy-2-nitrobenzaldehyde; and (b) Reacting the benzyloxy-2-nitrobenzaldehyde with a 1-nitroalkane in the presence of an alkali-metal hydroxide and at a temperature between about zero and about minus forty degrees centigrade, preferably about minus fifteen degrees centigrade, to produce a benzyloxy-2-nitro-α-[1-(1-nitroalkyl)]-benzyl alcohol-alkali metal salt, and thereafter acidifying the thus-produced salt to yield the benzyloxy-2-nitro-α-[1-(1-nitroalkyl)]-benzyl alcohol; and (c) Dehydrating the benzyloxy-2-nitro-α-[1-(1-nitroalkyl)]-benzyl alcohol by reacting the alcohol with an aliphatic acid anhydride, e. g., acetic anhydride, at a temperature between about fifty and about 150 degrees centigrade, preferably about eighty degrees centigrade, to produce a benzyloxy-β,2-dinitrostyrene; and (d) Subjecting the benzyloxy-β,2-dinitrostyrene to reductive cyclization by reacting the styrene with powdered iron in an organic acid medium, such as acetic, propionic, butyric, or the like, at a temperature between about 50 and about 120 degrees centigrade to produce the 7-benzyloxyindole, 6-benzyloxyindole, 5-benzyloxyindole, and 4-benzyloxyindole, respectively.

The starting 4-, 5-, 6-, and 7-halo, cyano, carboxy, carbalkoxy, dialkylamino, aryl, aralkyl, alkyl, and aryloxy substituted indoles can be prepared by reacting the corresponding 2-nitrobenzaldehyde with a 1-nitroalkane to prepare the benzyl alcohol, dehydrating, and reductively cyclizing as described above.

(3) The starting alkoxyindoles employed in the process of the present invention are prepared by the procedure outlined by Blaikie et al. (J. Chem. Soc. 1924, 296) in the preparation of 4-, 5-, and 7-methoxyindoles by utilizing the requisite alkoxy-2-nitrotoluene. The 6-alkoxyindoles are prepared by the procedure employed by Kermack et al. (J. Chem. Soc. 1921, 1602).

(4) The preparation of 2-substituted indoles is advantageously carried out by various procedures, e. g., the Fischer synthesis, involving the cyclization of arylhydrazones of methyl ketones, is readily applicable to the preparation of 2-substituted indoles. Thus, for example, Elderfield, "Heterocyclic Compounds," vol. 3, page 14, 1952, John Wiley and Sons, shows the cyclization of the phenylhydrazone of acetophenone to prepare 2-phenylindole. In a similar manner the 2-benzyl- and 2-naphthylindoles are prepared by utilizing the corresponding phenylhydrazine and the corresponding methyl aralkyl (or aryl) ketone. The Fischer synthesis can also be employed to prepare 2-methylindoles by reacting acetone and the corresponding arylhydrazine.

The preparation of other 2-lower-alkylindoles is advantageously carried out by the condensation of the corresponding benzaldehyde and 1-nitroalkane as more fully disclosed above.

The starting fused arylene indoles, e. g., benzindoles, are prepared by the process described by Rydon et al., J. Chem. Soc. 1951, 2462.

On glyoxylation, the starting 1,3-dihydroindoles are converted to 1-hydro-3-indoleglyoxylyl halides having the formula:

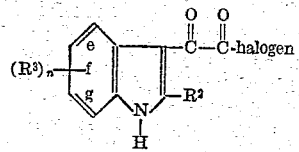

wherein R², R³, and n are as given above, and on amidation with ammonia or a primary or secondary amine, the 1-hydro-3-indoleglyoxylyl halide is converted to a 1-hydro-3-indoleglyoxylamide having the formula:

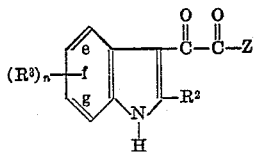

wherein R², R³, and n have the values given above, and Z represents a primary, secondary, or tertiary amido radical. Thus Z can be the amido radical corresponding to ammonia and primary and secondary amines. The secondary and tertiary amido radicals thus represented by Z include such radicals as alkylamido, aralkylamido, cycloalkylamido, arylamido, dicycloalkylamido, diaralkylamido, dialkylamido, alkyl aralkylamido, alkyl cycloalkylamido, alkyl arylamido, aralkyl cycloalkylamido, aralkyl arylamido, and cycloalkyl arylamido, and Z can also represent a monoheterocyclic amido radical, including amido radicals such as piperidyl, morpholinyl, pyrrolidyl, thiamorpholinyl, hexamethyleneimino, tetrahydroisoquinolyl, hexahydroisoquinolyl, and the like.

In carrying out the process of the present invention the 1-hydro-3-indoleglyoxylyl halides are prepared by reacting a 1,3-dihydroindole with an oxalyl halide in the presence of an inert organic solvent, such as ether, petroleum ether, methylcyclohexane, dioxan, and the like. Aromatic hydrocarbons, such as benzene and the like can also be employed when the acid halide is not to be isolated. Stoichiometric quantities (i. e., equimolar) are advantageously employed. The reaction is advantageously conducted at about 25 degrees centigrade although other temperatures between about ten degrees centigrade and about the boiling point of the solvent employed can also be utilized. The reaction is generally completed between about fifteen minutes and about eight hours, longer periods being required for lower reaction temperatures and/or less reactive indoles. The reaction mixture generally reddens, but soon decolorizes, whereupon a precipitate generally begins to form. After standing between about one and about eight hours, the reaction mixture is cooled to about zero degrees centigrade whereupon the 1-hydro-3-indoleglyoxylyl halide precipitate can be recovered by filtration.

In the preparation of 1-hydro-3-indoleglyoxylamides, the starting 1,3-dihydroindole is first glyoxylated and then subjected to amidation advantageously by the process of this invention, wherein the 1,3-dihydroindole is reacted with an oxalyl halide to form a 1-hydro-3-indoleglyoxylyl halide which is reacted with ammonia or a primary or secondary amine to form the desired amide. Ammonia is employed to produce a primary amide, and primary and secondary amines to produce secondary and tertiary amides, respectively. The amidation reaction is advantageously conducted at a temperature about zero degrees and about 100 degrees centigrade, preferably at about 25 degrees centigrade and is usually completed between about thirtyminutes and about five hours, the longer reaction period being required at the lower temperatures. The reaction is advantageously carried out in the presence of inert solvents such as aliphatic hydrocarbons, aromatic hydrocarbons, ketones, and ethers, with benzene being preferred, but the reaction can also be completed without a solvent.

The 1-hydro-3-indoleglyoxylamides are thereupon converted, e. g., by the Baker process discussed earlier, to 1-alkyl or 1-aralkyl-3-indoleglyoxylamides having the formula:

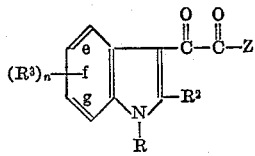

wherein R², R³, Z and n have the values given above and R represents an alkyl radical containing up to twenty carbon atoms such as methyl, ethyl, propyl, hexyl, decyl, hexadecyl, and the like; or an aralkyl radical containing up to fifteen carbon atoms, e. g., benzyl, phenethyl, phenylbutyl, halobenzyl, such as para-chlorobenzyl, alkylbenzyl, such as para-methylbenzyl, alkoxybenzyl, such as para-methoxybenzyl, and the like.

Alternatively, 1 - dehydro - 3 - indoleglyoxylamides, wherein the 1-substituent is alkyl, aralkyl, or aryl, can be prepared, as discussed earlier, by glyoxylation of the corresponding 1-dehdyro-3-hydroindoles to prepare 1-dehydro-3-indoleglyoxylyl halides and subjecting the latter to amidation to produce the 1-deyhdro-3-indoleglyoxylamides.

The thus-produced 1-dehydro-3-indoleglyoxylamides are reduced with lithium aluminum hydride to produce the corresponding 1 - dehydro - 3-(2-amino-1-hydroxyethyl)-indoles which, for the most part, can be represented as having the formula:

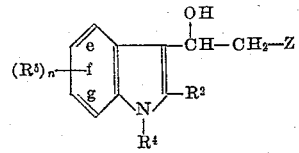

wherein R³, n and Z have the values given above. More specifically Z represents

wherein R⁶ and R⁷ represent hydrogen, aryl, aralkyl, and alkyl and when taken together with —N< also represent a heterocyclic amino radical. R⁴ represents an alkyl radical containing up to twenty carbon atoms, an aryl radical containing up to fifteen carbon atoms, or an aralkyl radical containing up to fifteen carbon atoms; and R⁵ represents hydroxy, dialkylamino, methylol ($CH_2OH$), aminomethyl ($CH_2NH_2$), halogen, alkyl, aryl, aralkyl, aryloxy, a fused arylene radical, a benzyloxy radical, and a loweralkoxy radical. Reduction of 1-dehydro-3-indoleglyoxylamides wherein R³, as previously identified, is an acyloxy, cyano, carboxy, or a lower-carbalkoxy radical results in the conversion of these substituents to a hydroxy, aminomethyl ($CH_2NH_2$), methylol ($CH_2OH$), and methylol radical respectively. The reduction of the 1-dehydro-3-indoleglyoxylamides is advantageously carried out in the presence of an inert solvent such as ether, tetrahydrofuran, N-ethylmorpholine, dibutyl ether, and the like, with tetrahydrofuran being preferred. The reduction is advantageously accomplished at the boiling point of the solvent used, although other temperatures between about zero and about 100 degrees centigrade can be employed, and preferably zero to 65 degrees centigrade. After a suitable reaction period, usually from thirty minutes to five hours, the free bases are readily obtained as viscous oils, or in some instances in crystalline condition, by hydrolyzing the reaction mixture with aqueous ether followed by dilute alkali, decanting the solvent layer, extracting the alkaline residue with several portions of ether, combining the ether extracts and decanted solvent layer, and evaporating the solvent. Other conventional procedures for the hydrolysis can be used if desired, and other organic extractants can be used in place of ether.

The 1-dehydro-3-(2-amino-1-hydroxyethyl)-indoles thus obtained can be converted to acid addition salts, if so desired. For example, a solution of the desired acid addition salt can be prepared by mixing stoichiometric amounts of a free base of the invention and an inorganic or organic acid in the presence of water. Examples of acids are hydrochloric, hydrobromic, sulfuric, phosphoric, pyruvic, acetic, tartaric, citric, benzoic, trichloroacetic, and the like. A quaternary ammonium salt such as the methoiodide, ethoiodide, benzyl chloride, and the like may also be prepared by reacting the tertiary amine free base in a suitable inert solvent with an alkyl or aralkyl halide, or with dimethyl sulfate, methyl para-toluenesulfonate, and the like.

The reduction of the starting 1-dehydro-3-indoleglyoxylamides can also be accomplished in a stepwise manner, if so desired. For example, the ring-attached carbonyl group of the starting 1-dehydro-3-indoleglyoxylamide can be partially reduced to a carbinol group by utilizing reducing agents other than lithium aluminum hydride, e. g., sodium borohydride, lithium borohydride, aluminum amalgam, and catalytic hydrogenation using platinum oxide catalyst. Further reduction of the intermediate 1-dehydro-3-indoleglycolamide with lithium aluminum hydride according to the process of the present invention will produce the desired 1-dehydro-3-(2-amino-1-hydroxyethyl)-indole.

The 1-dehydro-3-(2-amino-1-hydroxyethyl)-indoles and salts produced by the process of the present invention have physiological activity, and more particularly hypotensive activity and diuretic activity. Moreover, the present compounds can be reacted with fluosilicic acid to form fluosilicate salts which in dilute aqueous solution are effective mothproofing agents, as more fully disclosed in U. S. Patents 2,075,359 and 1,915,334.

The 4-, 5-, 6-, or 7-aralkoxy or alkoxy-1-dehydro-3-(2-amino-1-hydroxyethyl)-indoles can be further converted, if so desired, to the corresponding 4-, 5-, 6-, or 7-hydroxy compounds by dearalkylation or dealkylation, respectively. The dearalkylation can be carried out by hydrogenolysis in the presence of a catalyst, advantageously palladium on charcoal. The dealkylation can be accomplished by treatment with aluminum chloride according to the procedure outlined by Asero et al. [Ann. 576, 69–74 (1952)].

Representative 3-hydroindoles which can be employed herein include the following: 1-methylindole, 1-methyl-2-benzylindole, 1,2-diethylindole, 1-benzylindole, 1-phenethyl-2-phenylindole, 1-methyl-2-phenylindole, 1-ethyl-2-(para-chlorophenyl)-indole, 1-ethyl-2-(para-chlorophenyl)-5-methylindole, 1-ethyl-2-phenyl-5-benzyloxyindole, 1-phenethyl-2-propyl-6-benzyloxyindole, 1-hexyl-6-benzyloxyindole, 1-(para-chlorobenzyl)-5-(para,para'-dichlorobenzhydryloxy)-indole, 1,2-dipropyl-6-(para,para'-dimethylbenzhydryloxy)-indole 1-(para-ethoxybenzyl)-2-methyl-5-(para,para'-diethoxybenzhydryloxy)-indole, 1-(para-methoxybenzyl)-5-(para-methoxybenzyloxy)-indole, 1-hexyl-4-(para-methoxybenzyloxy)-indole, 1-phenethyl-2-phenyl-6-(para-propoxybenzyloxy-indole, 1,2-dioctyl-6-(para-methylbenzyloxy)-indole, 1-(para-ethylbenzyl)-2-ethyl-5-(para-butylbenzyloxy)-indole, 1-decyl-6-(para-ethylbenzyloxy)-indole, 1-(para-chlorobenzyl)-6-para-chlorobenzyloxy)-indole, 1-benzyl-5-(para-bromobenzyloxy)-indole, 1-propyl-2-naphthyl-5-methoxyindole, 1-methyl-5-methoxyindole, 1-ethyl-2-phenyl-5-ethoxyindole, 1,2-dibenzyl-5,6-diethoxyindole, 1-methyl-5,6-diacetoxyindole, 1-(para-ethylbenzyl)-2-benzyl-5-acetoxyindole, 1-(para-methylbenzyl)-5,6-diacetoxyindole, 1-(para-chlorobenzyl)-2-benzyl-6-butyroxyindole, 1-phenethyl-2-phenyl-5-chloroindole, 1-ethyl-2-tolyl-5-bromoindole, 1-(para-methylbenzyl)-2-propyl-6-cyanoindole, 1-hexadecyl-4-cyanoindole, 1-(para-chlorobenzyl)-2-butyl-6-cyanoindole, 1-methyl-2-phenyl-6-carbomethoxyindole, 1-benzyl-2-tolyl-4-carbethoxyindole, 1-decyl-4-carbomethoxyindole, 1-phenethyl-2-ethyl-5-carboxyindole, 1-butyl-6-carboxyindole, 1-(para-chlorobenzyl)-2-phenethyl-4-carboxyindole, 1-octyl-5-dimethylaminoindole, 1,2-benzyl-6-dimethylaminoindole, 1-octyl-6-dimethylaminoindole, 1-ethyl-2-phenyl-5-methylindole, 1-benzyl-2,7-diethylindole, 1-phenethyl-2-phenyl-5,6-dimethylindole, 1,5-dimethylindole, 1,2,5-tribenzylindole, 1-ethyl-2-phenyl-4-phenethylindole, 1-octyl-2-naphthyl-6-benzylindole, 1-benzyl-2,5-diphenylindole, 1-(para-chlorobenzyl)-2,4-diphenylindole, 1-octyl-2-(2-ethoxynaphthyl)-6-phenylindole, 1-ethyl-1-benz-(g)-indole, 1-ethyl-1-benz-(f)-indole, 1-decyl-5-phenoxyindole, 1-propyl-4-naphthoxyindole, 1-ethyl-2-(para-biphenylyl)-indole, 1-methyl-2-(para-biphenylyl)-indole, 1-benzyl-2-phenyl-5,7-dichloroindole, 1-phenyl-7-methoxyindole, 1,2-diphenylindole, 1-phenyl-2-methylindole, 1-phenylindole, 2-para-biphenylylindole, 2-phenyl-5-methoxyindole, 2-phenyl-6-methylindole, 2-phenylindole, 4-chloroindole, 2-para-biphenylyl-5,7-dichloroindole, 2-methyl-5,7-dichloroindole, 2-phenyl-4,7-dichloroindole, 5,6-dimethoxyindole, 2-(para-methylphenyl)-5-methylindole, 4-cyanoindole, 4-carboxyindole, 4-carbomethoxyindole, 5-bromoindole, 2-methylindole, 5-ethylindole, 7-methylindole, 2,4-dimethylindole, 2-(para-methoxyphenyl)-5-methoxyindole, 5-benzyloxyindole, 6-benzyloxyindole, 2-phenyl-5,7-dimethylindole, 2,5-diphenylindole, 5-ethoxyindole, 2,4,7-trimethylindole, 2-benzylindole, 5,6-dibromoindole, 2-methyl-5,6-dimethoxyindole, 2-methyl-5-fluoroindole, 2-hexylindole, 4-acetoxyindole, 2-methyl-5,6-diacetoxyindole, 5-methoxy-6-acetoxyindole, 2-(2-naphthyl)-7-chloroindole, 1-benz-(g)-indole, 5-phenoxyindole, 6-dimethylaminoindole, 2-t-butylindole, 7-benzhydryloxyindole, 4-(para-methoxybenzyloxy)-indole, 7-benzylindole, 6-(para-chlorobenzyloxy)-indole, 6-(para,para'-dimethylbenzhydryloxy)-indole, and the like.

The following examples are illustrative of the process and products of the present invention, but are not to be construed as limiting.

EXAMPLE 1.—PREPARATION OF 1-METHYL-3-(2-METHYLAMINO-1-HYDROXYETHYL)-INDOLE

A. *3-indoleglyoxylyl chloride*

To a solution of 25 grams (0.21 mole) of indole and 500 milliliters of anhydrous ether was added 25 milliliters (0.29 mole) of oxalyl chloride. The solution turned red and immediately decolorized, followed by the precipitation of a yellow solid. After standing overnight the solid was collected, washed with dry ether, and dried under reduced pressure. The compound, 3-indoleglyoxylyl chloride, weighed 42 grams and melted at 129 degrees centigrade.

B. *N-methyl-3-indoleglyoxylamide*

Gaseous methylamine was passed into a suspension of twenty grams (0.1 mole) of 3-indoleglyoxylyl chloride in 200 milliliters of dry benzene. After two hours the solid precipitate was filtered and washed with water. The product, N-methyl-3-indoleglyoxylamide, was recrystallized from isopropanol and melted at 218–219 degrees centigrade. The yield was 19.6 grams (97 percent).

*Analysis.*—Calcd. for $C_{11}H_{10}N_2O_2$: C, 65.33; H, 4.98; N, 13.86. Found: C, 65.79; H, 4.52; N, 13.90.

C. *1,N-dimethyl-3-indoleglyoxylamide*

A solution of sodium ethoxide was prepared from 400 milliliters of absolute ethanol and 2.76 moles of sodium. To this solution was added 20.2 grams (0.1 mole) of N-methyl-3-indoleglyoxylamide and the mixture was placed in a pressure flask. After the addition of 14.2 grams (0.1 mole) of methyl iodide the flask was sealed and the mixture heated at 65–75 degrees centigrade for eighteen hours. During this period long prismatic crystals separated. These were filtered and the filtrate concentrated. The recrystallized product, 1,N-dimethyl-3-indoleglyoxylamide, melted at 206–207 degrees centigrade. The yield was eighteen grams (83.5 percent).

*Analysis.*—Calcd. for $C_{12}H_{12}N_2O_2$: C, 66.65; H, 5.59; N, 12.96. Found: C, 67.05; H, 5.59; N, 13.38.

D. *1-methyl-3-(2-methylamino-1-hydroxyethyl)-indole*

Five grams (0.023 mole) of 1,N-dimethyl-3-indoleglyoxylamide was dissolved in 400 milliliters of tetrahydrofuran. This solution was added to five grams (0.13 mole) of lithium aluminum hydride dissolved in 100 milliliters of tetrahydrofuran. After refluxing the mixture for three hours the source of heat was removed and the flask cooled in an ice-bath. The excess reducing agent was destroyed through addition of 500 milliliters of USP ether followed by fifty milliliters of ten percent sodium hydroxide solution. The clear solvent layer was decanted at low temperature under reduced pressure. The remaining oil crystallized; upon recrystallization from ethyl acetate the product melted at 137–139 degrees centigrade. A second recrystallization gave 3.5 grams (74.7 percent) of 1-methyl-3-(2-methylamino-1-hydroxyethyl)-indole which melted at 138–140 degrees centigrade.

*Analysis.*—Calcd. for $C_{12}H_{16}N_2O$: C, 70.56; H, 7.90; N, 13.72. Found: C, 70.81; H, 7.90; N, 13.42.

EXAMPLE 2.—PREPARATION OF 1-METHYL-3-(2-BENZYLMETHYLAMINO-1-HYDROXYETHYL)-INDOLE

A. *N-benzyl-N-methyl-3-indoleglyoxylamide*

To a suspension of 31 grams (0.15 mole) of 3-indoleglyoxylyl chloride, prepared as disclosed in Example 1, part A, in 500 milliliters of benzene was added 38.72 grams (0.32 mole) of benzylmethylamine. The mixture became hot and a heavy precipitate formed. After three hours the solid was filtered and washed with water. A small amount of additional solid was isolated from the benzene filtrate by concentration. The combined solids were recrystallized from isopropanol and 42 grams (87 percent yield) of N-benzyl-N-methyl-3-indoleglyoxylamide, melting at 172.5–173.5 degrees centigrade, was isolated.

*Analysis.*—Calcd. for $C_{18}H_{16}N_2O_2$: C, 73.95; H, 5.52; N, 9.58. Found: C, 74.22; H, 5.29; N, 9.86.

B. *1,N-dimethyl-N-benzyl-3-indoleglyoxylamide*

To a solution of sodium ethoxide prepared from 500 milliliters of absolute ethanol and 4.6 grams (0.2 mole) of sodium was added 32 grams (0.1 mole) of N-benzyl-N-methyl-3-indoleglyoxylamide and 21.28 grams (0.15 mole) of methyl iodide. The mixture was heated at seventy degrees for eighteen hours in a pressure bottle. The cooled mixture was concentrated under reduced pressure and the solid thus obtained was recrystallized three times from isopropanol. The product, 1,N-dimethyl-N-benzyl-3-indoleglyoxylamide, melted at 112–113 degrees centigrade.

*Analysis.*—Calcd. for $C_{19}H_{18}N_2O_2$: C, 74.49; H, 5.92; N, 9.15. Found: C, 74.54; H, 5.78; N, 9.36.

C. *1-methyl-3-(2-benzylmethylamino-1-hydroxyethyl)-indole*

Ten grams (0.03 mole) of 1,N-dimethyl-N-benzyl-3-indoleglyoxylamide was reduced in tetrahydrofuran solution with 7.4 grams (0.2 mole) of lithium aluminum hydride in the same manner as in Example 1, to produce 1-methyl-3-(2-benzylmethylamino-1-hydroxyethyl)-indole.

EXAMPLE 3.—PREPARATION OF 1-METHYL-3-(2-MORPHOLINO-1-HYDROXYETHYL)-INDOLE

A. *3-indoleglyoxylic acid morpholide*

A solution of fifty grams of indole and 1250 milliliters of anhydrous ether was mixed with 45 milliliters of oxalyl chloride. After about thirty minutes the precipitate was collected and added to one thousand milliliters of anhydrous benzene containing 135.5 grams of morpholine. The resulting paste was vigorously stirred for one hour, and 75 milliliters of water was added thereto. The resulting precipitate was collected after stirring for about thirty minutes, washed thoroughly with benzene, slurried in water, filtered, and dried. The yield of 3-indoleglyoxylic acid morpholide was 101.3 grams; the melting point, after recrystallization from alcohol, was 182–184 degrees centigrade.

*Analysis.*—Calcd. for $C_{14}H_{14}N_2O_3$: C, 65.09; H, 5.46; N, 10.84. Found: C, 65.25; H, 5.15; N, 10.85.

B. *1-methyl-3-indoleglyoxylic acid morpholide*

A solution of 1.6 grams (0.07 mole) of sodium was prepared in 200 milliliters of absolute ethanol. To the solution was added 12.9 grams (0.05 mole) of 3-indoleglyoxylic acid morpholide and 14.9 grams (0.1 mole) of methyl iodide. The mixture was placed in a pressure flask and heated at seventy degrees for sixty hours. The mixture crystallized on cooling and the solid was filtered and recrystallized from isopropanol. The product, 1-methyl-3-indoleglyoxylic acid morpholide, melted at 177–178.5 degrees centigrade.

*Analysis.*—Calcd. for $C_{15}H_{16}N_2O_3$: C, 66.15; H, 5.92; N, 10.84. Found: C, 66.49; H, 5.80; N, 10.20.

C. *1-methyl-3-(2-morpholino-1-hydroxyethyl)indole*

Seven grams (0.03 mole) of 1-methyl-3-indoleglyoxylic acid morpholide was dissolved in 75 milliliters of tetrahydrofuran. This solution was added to 3.7 grams (0.1 mole) of lithium aluminum hydride dissolved in 200 milliliters of tetrahydrofuran. The mixture was refluxed for two hours and cooled in an ice-bath. The mixture was treated with 500 milliliters of U. S. P. ether followed by 25 milliliters of ten percent sodium hydroxide solution. The solvent layer was decanted and the alkali layer washed with several 100-milliliter portions of ether. The combined solvents were concentrated under reduced pressure and the remaining oil soon crystallized. The solid gave a brilliant red color with strong acid. An infrared spectrum of the material indicated the presence of a hydroxyl group. Analytical data was in agreement with this indication. The product, 1-methyl-3-(2-morpholino-1-hydroxyethyl)-indole, melted at 99–100 degrees centigrade after two recrystallizations from ethyl acetate.

*Analysis.*—Calcd. for $C_{15}H_{20}N_2O_2$: C, 69.20; H, 7.74; N, 10.76. Found: C, 69.37; H, 7.85; N, 10.88.

EXAMPLE 4.—PREPARATION OF 1-METHYL-3-(2-BENZYLAMINO-1-HYDROXYETHYL)-INDOLE

A. *N-benzyl-3-indoleglyoxylamide*

A 17.9 gram sample of 3-indoleglyoxylyl chloride, prepared as disclosed in Example 1, part A, was added in small portions to a cold, stirred solution of 42.8 grams of benzylamine and 300 milliliters of anhydrous ether. After a period of about twenty hours a solution of 21.2 grams of sodium carbonate and fifty milliliters of water was added, the mixture slurried thirty minutes, and thereupon filtered. The recovered precipitate was then stirred two hours in fifteen hundred milliliters of water containing five grams of sodium carbonate and two hundred milliliters of Skellysolve B. The product, N-benzyl-3-indoleglyoxylamide, was collected, washed with water, and dried. A yield of 21.1 grams was obtained and the product melted at 172–173.5 degrees centigrade.

*Analysis.*—Calcd. for $C_{17}H_{14}N_2O_2$: C, 73.36; H, 5.07; N, 10.07. Found: C, 73.66; H, 5.11; N, 10.33.

B. *1-methyl-N-benzyl-3-indoleglyoxylamide*

A solution of sodium ethoxide in absolute ethanol was prepared from 4.6 grams (0.2 mole) of sodium and 800 milliliters of absolute ethanol. To this was added 27.8 grams (0.1 mole) of N-benzyl-3-indoleglyoxylamide. The mixture was placed in a pressure flask with 21.6 grams (0.15 mole) of methyl iodide and warmed to eighty degrees centigrade for 72 hours. The cooled mixture was concentrated under reduced pressure and the residue washed with water to remove sodium iodide.

After three recrystallizations from isopropanol the product, 1-methyl-N-benzyl-3-indoleglyoxylamide, melted at 141.5–143 degrees centigrade.

*Analysis.*—Calcd. for $C_{18}H_{16}N_2O_2$: C, 73.95; H, 5.52; N, 9.58. Found: C, 74.07; H, 5.01; N, 9.79.

C. *1-methyl-3-(2-benzylamino-1-hydroxyethyl)-indole*

Ten grams (0.03 mole) of 1-methyl-N-benzyl-3-indoleglyoxylamide was dissolved in 100 milliliters of tetrahydrofuran and added to a solution of five grams (0.135 mole) of lithium aluminum hydride in 200 milliliters of tetrahydrofuran. The mixture was refluxed for three hours and the crude product was isolated in the same manner as disclosed in Example 1, part D. The product, 1-methyl-3-(2-benzylamino-1-hydroxyethyl)-indole, was recrystallized three times from ethyl acetate and melted at 111–113 degrees centigrade.

*Analysis.*—Calcd. for $C_{18}H_{20}N_2O$: C, 77.11; H, 7.19; N, 9.99. Found: C, 76.83; H, 7.28; N, 9.86.

EXAMPLE 5.—PREPARATION OF 1-ETHYL-3-(2-DIMETHYLAMINO-1-HYDROXYETHYL)-INDOLE AND SALTS THEREOF

A. *N,N-dimethyl-3-indoleglyoxylamide*

A suspension of forty grams (0.2 mole) of 3-indoleglyoxylyl chloride, prepared as disclosed in Example 1, part A, in 500 milliliters of dry benzene was saturated with gaseous dimethylamine for two hours. A clear solution resulted. The benzene was concentrated and the solid residue slurried with water to dissolve dimethylamine hydrochloride. The insoluble residue was filtered and recrystallized first from isopropanol-water and finally from methyl cyclohexane-ethyl acetate. The product, N,N-dimethyl-3-indoleglyoxylamide, melted at 159–160 degrees centigrade and weighed 38 grams (88 percent yield).

*Analysis.*—Calcd. for $C_{12}H_{12}N_2O_2$: C, 66.65; H, 5.59; N, 12.96. Found: C, 66.96; H, 5.85; N, 13.26.

B. *1-ethyl-N,N-dimethyl-3-indoleglyoxylamide*

A solution of 4.6 grams (0.2 mole) of sodium in 800 milliliters of absolute ethanol was prepared and to this was added 32.4 grams (0.15 mole) of N,N-dimethyl-3-indoleglyoxylamide. The solution was placed in a pressure flask and 23.38 grams (0.15 mole) of ethyl iodide added. This mixture was heated at eighty degrees centigrade for 72 hours. The solution was concentrated and the residue shaken with water to remove sodium iodide. The organic residue was recrystallized from aqueous ethanol. The product, 1-ethyl-N,N-dimethyl-3-indoleglyoxylamide, melted at 141–143 degrees centigrade.

*Analysis.*—Calcd. for $C_{14}H_{16}N_2O_2$: C, 68.83; H, 6.60; N, 11.74. Found: C, 68.62; H, 6.47; N, 11.76.

C. *1-ethyl-3-(2-dimethylamino-1-hydroxyethyl)-indole*

Ten grams (0.4 mole) of 1-ethyl-N,N-dimethyl-3-indoleglyoxylamide was dissolved in 200 milliliters of tetrahydrofuran. The solution was added to five grams (0.135 mole) of lithium aluminum hydride in solution in 200 milliliters of tetrahydrofuran. The mixture was refluxed for three hours and cooled overnight. The excess lithium aluminum hydride was destroyed with 500 milliliters of USP ether followed by fifty milliliters of ten percent sodium hydroxide solution. The solvent layer was decanted and concentrated. The solid obtained was twice recrystallized from ethyl acetate to yield 4.8 grams (52 percent) of 1-ethyl-3-(2-dimethylamino-1-hydroxyethyl)-indole which melted at 82–83 degrees centigrade.

*Analysis.*—Calcd. for $C_{14}H_{20}N_2O$: C, 72.38; H, 8.68; N, 12.06. Found: C, 72.54; H, 8.57; N, 11.86.

D. *1 - ethyl - 3 - (2 - dimethylamino - 1 - hydroxyethyl) indole pyruvate*

To 100 milligrams of 1-ethyl-3-(2-dimethylamino-1-hydroxyethyl)-indole in twenty milliliters of anhydrous ether was added 35 milligrams of pyruvic acid in one milliliter of ether. A white solid precipitate, 1-ethyl-3-(2-dimethylamino-1-hydroxyethyl)-indole pyruvate, was obtained which foamed at 112.5 degrees centigrade and melted at 116 degrees centigrade.

*Analysis.*—Calcd. for $C_{17}H_{24}N_2O_4$: C, 63.75; H, 7.54; N, 8.53. Found C, 64.20; H, 7.71; N, 8.63.

E. *1 - ethyl - 3 - (2 - dimethylamino - hydroxyethyl) - indole trichloroacetate*

To 100 milligrams of 1-ethyl-3-(2-dimethylamino-1-hydroxyethyl)-indole in twenty milliliters of anhydrous ether was added 65 milligrams of trichloroacetic acid in one milliliter of ether. The resulting precipitate, 1-ethyl-3-(2-dimethylamino-1-hydroxyethyl)-indole trichloroacetate, weighed 150 milligrams and melted at 92 to 95.5 degrees centigrade.

F. *1 - ethyl - 3 - (2 - dimethylamino - 1 - hydroxyethyl) - indole hydrochloride*

To a solution of 100 milligrams of 1-ethyl-3-(2-dimethylamino-1-hydroxyethyl)-indole in 15 milliliters of anhydrous ether was added a volume of 0.2 N isopropanol-hydrogen chloride calculated to contain 0.75 equivalent of hydrogen chloride, based on the amine. A sticky solid precipitated which was washed with ether and dried to yield crystalline 1-ethyl-3-(2-dimethylamino - 1 - hydroxyethyl) - indole hydrochloride, which melted with decomposition at 108.5 to 111 degrees centigrade.

EXAMPLE 6.—PREPARATION OF 1-METHYL-3-(2-AMINO-1-HYDROXYETHYL)-INDOLE

A. *3-indoleglyoxylamide*

To a 25 gram sample of indole dissolved in 500 milliliters of anhydrous ether at room temperature was added 25 milliliters of oxalyl chloride. After the vigorous reaction had subsided the precipitate was filtered and washed with ether. The precipitate, 3 - indoleglyoxlyl chloride, was added to 700 milliliters of anhydrous ether in a one-liter flask and cooled to between zero degrees and ten degrees centigrade. Anhydrous ammonia was added thereto with stirring until the yellow color disappeared, the precipitate stirred for two additional hours, slurried one hour in 500 milliliters of water, and then the precipitate was collected and washed thoroughly with water. After drying the 3-indoleglyoxylamide weighed 33.7 grams (92.4 percent).

B. *1-methyl-3-indoleglyoxylamide*

A solution of sodium ethoxide was prepared from 525 milliliters of absolute ethanol and three grams (0.13 mole) of sodium. To this solution in a pressure bottle was added 22.5 grams (0.12 mole) of 3-indoleglyoxylamide and 18.7 grams (0.13 mole) of methyl iodide. The mixture was heated at 75–80 degrees centigrade for eighteen hours. The alcohol was distilled and the residue recrystallized from isopropanol. The product, 1-methyl-3-indoleglyoxylamide, weighed nineteen grams and melted at 185–187 degrees centigrade.

*Analysis.*—Calcd. for $C_{11}H_{10}N_2O_2$: C, 65.33; H, 4.98; N, 13.86. Found: C, 65.27; H, 4.76; N, 14.12.

C. *1-methyl-3-(2-amino-1-hydroxyethyl)-indole*

Ten grams (0.05 mole) of 1-methyl-3-indoleglyoxylamide was dissolved in tetrahydrofuran and added to 7.4 grams (0.2 mole) of lithium aluminum hydride in 200 milliliters of tetrahydrofuran. The mixture was refluxed for three hours, cooled, and the excess lithium aluminum hydride was destroyed with USP ether followed by ten percent sodium hydroxide solution. The concentration of the solvent gave 1-methyl-3-(2-amino-1-hydroxyethyl)-indole as a light pink oil.

Example 7.—Preparation of 1-Methyl-3-(2-Dibenzyl-amino-1-Hydroxyethyl)-Indole

A. *N,N-dibenzyl-3-indoleglyoxylamide*

In the same manner as disclosed in Example 4, part A, N,N-dibenzyl-3-indoleglyoxylamide, melting at 166.5–167.5 degrees centigrade, was prepared by employing dibenzylamine instead of benzylamine.

B. *1-methyl-N,N-dibenzyl-3-indoleglyoxylamide*

A solution of sodium ethoxide was prepared through the addition of 2.3 grams (0.1 mole) of sodium to 250 milliliters of absolute ethanol. To this solution was added eighteen grams (0.1 mole) of N,N-dibenzyl-3-indoleglyoxylamide and twenty grams (0.14 mole) of methyl iodide. This mixture was heated at 75 degrees centigrade for eighteen hours in a pressure flask. The solvent was concentrated and water added to dissolve the sodium iodide. The resulting gum crystallized slowly and was recrystallized from isopropanol. The product, 1-methyl-N,N-dibenzyl-3-indoleglyoxylamide, melted at 109–111 degrees centigrade.

*Analysis.*—Calcd. for $C_{25}H_{22}N_2O_2$: C, 78.49; H, 5.79; N, 7.32. Found: C, 78.85; H, 5.79; N, 7.38.

C. *1-methyl-3-(2-dibenzylamino-1-hydroxyethyl)-indole*

Seven grams (0.018 mole) of 1-methyl-N,N-dibenzyl-3-indoleglyoxylamide in fifty milliliters of tetrahydrofuran was added to five grams (0.135 mole) of lithium aluminum hydride in 100 milliliters of the same solvent. After refluxing for two hours the mixture was cooled in an ice-bath and 500 milliliters of USP ether added. After the addition of fifty milliliters of ten percent sodium hydroxide solution the solvent layer was decanted. Concentration of the solvent layer gave a solid which was crystallized twice from ethyl acetate. The yield of 1-methyl-3-(2-dibenzylamino-1-hydroxyethyl)-indole was 4.5 grams (67.5 percent) and the product melted at 120.5–122 degrees centigrade.

*Analysis.*—Calcd. for $C_{25}H_{26}N_2O$: C, 81.04; H, 7.07; N, 7.56. Found: C, 81.29; H, 6.90; N, 7.59.

Example 8.—Preparation of 1-Methyl-3-(2-Anilino-1-Hydroxyethyl)-Indole

A. *N-phenyl-3-indoleglyoxylamide*

Twenty grams (0.1 mole) of 3-indoleglyoxylyl chloride prepared as described in Example 1, part A, was suspended in benzene and 18.6 grams (0.2 mole) of aniline added. After three hours the heavy precipitate was filtered, washed well with water to remove aniline hydrochloride, and the residual solid recrystallized from isopropanol. The yield of N-phenyl-3-indoleglyoxylamide was 26.4 grams (100 percent) and the product melted at 242–243 degrees centigrade.

*Analysis.*—Calcd. for $C_{16}H_{12}N_2O_2$: C, 72.71; H, 4.58; N, 10.60. Found: C, 72.58; H, 4.45; N, 10.78.

B. *1-methyl-N-phenyl-3-indoleglyoxylamide*

A solution of sodium ethoxide was prepared from 3.45 grams of sodium and 500 milliliters of absolute ethanol. To this solution was added twenty grams (0.76 mole) of N-phenyl-3-indoleglyoxylamide and 21.6 grams (0.15 mole) of methyl iodide. This mixture was heated for 36 hours at 65–75 degrees centigrade in a pressure bottle. The solvent was then concentrated and the residue recrystallized from ethanol. The product, 1-methyl-N-phenyl-3-indoleglyoxylamide, separated as long needles and melted at 150–152 degrees centigrade.

*Analysis.*—Calcd. for $C_{17}H_{14}N_2O_2$: C, 73.36; H, 5.07; N, 10.07. Found: C, 73.49; H, 4.84; N, 9.97.

C. *1-methyl-3-(2-anilino-1-hydroxyethyl)-indole*

In the same manner as disclosed in Example 7, part C, 1-methyl-N-phenyl-3-indoleglyoxylamide was reduced with lithium aluminum hydride to yield 1-methyl-3-(2-anilino-1-hydroxyethyl)-indole.

Example 9.—Preparation of 1-Methyl-3-(2-Dimethylamino-1-Hydroxyethyl)-Indole

A. *1,N,N-trimethyl-3-indoleglyoxylamide*

In the same manner as disclosed in Example 5, part B, 1,N,N-trimethyl-3-indoleglyoxylamide was prepared by reacting N,N-dimethyl-3-indoleglyoxylamide with methyl iodide instead of ethyl iodide. The compound melted between 107.5–108.5 degrees centigrade.

*Analysis.*—Calcd. for $C_{13}H_{14}N_2O_2$: C, 67.83; H, 6.13; N, 12.17. Found: C, 67.78; H, 5.98; N, 12.35.

B. *1-methyl-3-(2-dimethylamino-1-hydroxyethyl)-indole*

In the same manner as disclosed in Example 5, part C, 1,N,N-trimethyl-3-indoleglyoxylamide was reduced with lithium aluminum hydride to produce 1-methyl-3-(2-dimethylamino-1-hydroxyethyl)-indole which melted between 94–95 degrees centigrade.

*Analysis.*—Calcd. for $C_{13}H_{17}N_2O$: C, 71.52; H, 8.31; N, 12.83. Found: C, 71.96; H, 8.07; N, 12.36.

Example 10.—Preparation of 1-Ethyl-3-(2-Methylamino-1-Hydroxyethyl)-Indole

A. *1-ethyl-N-methyl-3-indoleglyoxylamide*

In the same manner as disclosed in Example 1, part C, 1-ethyl-N-methyl-3-indoleglyoxylamide was prepared by employing ethyl iodide in lieu of methyl iodide. The compound melted between 125–125.7 degrees centigrade.

*Analysis.* Calcd. for $C_{13}H_{14}N_2O_2$: C, 67.85; H, 6.12; N, 12.16. Found: C, 67.32; H, 5.96; N, 12.43.

B. *1-ethyl-3-(2-methylamino-1-hydroxyethyl)-indole*

In the same manner as disclosed in Example 1, part D, 1-ethyl-N-methyl-3-indoleglyoxylamide was reduced with lithium aluminum hydride to produce 1-ethyl-3-(2-methylamino-1-hydroxyethyl)-indole.

Example 11.—Preparation of 1-Isopropyl-3-(2-Dimethylamino-1-Hydroxyethyl)-Indole

A. *1-isopropyl-N,N-dimethyl-3-indoleglyoxylamide*

In the same manner as disclosed in Example 5, part B, 1-isopropyl-N,N-dimethyl-3-indoleglyoxylamide was prepared by reacting N,N-dimethyl-3-indoleglyoxylamide with isopropyl iodide instead of ethyl iodide. The compound melted between 113–114.5 degrees centigrade.

*Analysis.*—Calcd. for $C_{15}H_{18}N_2O_2$: C, 69.74; H, 7.02; N, 10.85. Found: C, 69.52; H, 6.64; N, 10.59.

B. *1-isopropyl-3-(2-dimethylamino-1-hydroxyethyl)-indole*

In the same manner as disclosed in Example 5, part C, 1-isopropyl-N,N-dimethyl-3-indoleglyoxylamide was reduced with lithium aluminum hydride to produce 1-isopropyl-3-(2-dimethylamino-1-hydroxyethyl)-indole.

Example 12.—Preparation of 1-Butyl-3-(2-Dimethylamino-1-Hydroxyethyl)-Indole

A. *1-butyl-N,N-dimethyl-3-indoleglyoxylamide*

In the same manner as disclosed in Example 5, part B, 1-butyl-N,N-dimethyl-3-indoleglyoxylamide was prepared by reacting N,N-dimethyl-3-indoleglyoxylamide with butyl iodide instead of ethyl iodide. The compound melted between 57.5–59 degrees centigrade.

*Analysis.*—Calcd. for $C_{16}H_{20}N_2O_2$: C, 70.55; H, 7.40; N, 10.28. Found: C, 70.85; H, 7.42; N, 10.32.

B. *1-butyl-3-(2-dimethylamino-1-hydroxyethyl)-indole*

In the same manner as disclosed in Example 5, part C, 1-butyl-N,N-dimethyl-3-indoleglyoxylamide was reduced with lithium aluminum hydride to produce 1-butyl-3-(2-dimethylamino-1-hydroxyethyl)-indole.

EXAMPLE 13.—PREPARATION OF 1-HEXYL-3-(2-DIMETHYL-AMINO-1-HYDROXYETHYL)-INDOLE

A. *1-hexyl-N,N-dimethyl-3-indoleglyoxylamide*

In the same manner as disclosed in Example 5, part B, 1-hexyl-N,N-dimethyl-3-indoleglyoxylamide was prepared by reacting N,N-dimethyl-3-indoleglyoxylamide with hexyl iodide instead of ethyl iodide. The compound melted between 58.5–61 degrees centigrade.

*Analysis.*—Calcd. for $C_{18}H_{24}N_2O_2$: C, 72.45; H, 7.43; N, 9.39. Found: C, 72.38; H, 7.46; N, 9.32.

B. *1-hexyl-3-(2-dimethylamino-1-hydroxyethyl)-indole*

In the same manner as disclosed in Example 5, part C, 1-hexyl-N,N-dimethyl-3-indoleglyoxylamide was reduced with lithium aluminum hydride to produce 1-hexyl-3-(2-dimethylamino-1-hydroxyethyl)-indole.

EXAMPLE 14.—PREPARATION OF 1-HEXADECYL-3-(2-DIMETHYLAMINO-1-HYDROXYETHYL)-INDOLE

A. *1-hexadecyl-N,N-dimethyl-3-indoleglyoxylamide*

In the same manner as disclosed in Example 5, part B, 1-hexadecyl-N,N-dimethyl-3-indoleglyoxylamide was prepared by reacting N,N - dimethyl - 3 - indoleglyoxylamide with 1-iodohexadecane instead of ethyl iodide. The compound melted between 61.5–63.5 degrees centigrade.

*Analysis.*—Calcd. for $C_{28}H_{44}N_2O_2$: C, 76.31; H, 10.06; N, 6.35. Found: C, 76.60; H, 10.06; N, 6.15.

B. *1-hexadecyl-3-(2-dimethylamino-1-hydroxyethyl)-indole*

In the same manner as disclosed in Example 5, part C, 1-hexadecyl-N,N-dimethyl-3-indoleglyoxylamide was reduced with lithium aluminum hydride to produce 1-hexadecyl-3-(2-dimethylamino-1-hydroxyethyl)-indole which melted between 48–49.5 degrees centigrade.

*Analysis.*—Calcd. for $C_{28}H_{47}N_2O$: C, 78.44; H, 11.28; N, 6.53. Found: C, 78.80; H, 11.27; N, 6.58.

EXAMPLE 15.—PREPARATION OF 1-METHYL-3-(2-ISOPROPYLAMINO-1-HYDROXYETHYL)-INDOLE

A. *1-methyl-3-indoleglyoxylyl chloride*

In a 500-milliliter, one-neck flask cooled in an ice-bath were placed 13.1 grams (0.1 mole) of 1-methylindole and 200 milliliters of dry ether. To this solution was added 14 grams (0.11 mole) of oxalyl chloride dissolved in fifty milliliters of dry ether. A bright yellow solid precipitated immediately and after standing in the ice-bath for one hour the solid material was collected on a filter, washed with dry ether and placed in a vacuum desiccator over phosphorus pentoxide. The dried product, 1-methyl-3-indoleglyoxylyl chloride, weighed 15.4 grams (seventy percent yield).

B. *1-methyl-N-isopropyl-3-indoleglyoxylamide*

A solution of 8.5 grams (0.144 mole) of isopropylamine and 25 milliliters of benzene was added over thirty minutes to a suspension of 10.6 grams (0.048 mole) of 1-methyl-3-indoleglyoxylyl chloride and 25 milliliters of benzene. The suspension was stirred for one and one-half hours until the yellow color had disappeared. The benzene was removed under reduced pressure and the residue slurried in water. The slurried residue was placed in an ice-bath whereupon crystallization occurred, and the solid was removed and recrystallized from approximately 75 percent alcohol. The product, 1-methyl-N-isopropyl-3-indoleglyoxylamide, weighed 9.7 grams (83 percent) and melted at 103–104.5 degrees centigrade.

*Analysis.*—Calcd. for $C_{14}H_{16}N_2O_2$: C, 68.82; H, 6.60; N, 11.06. Found: C, 69.67; H, 6.62; N, 11.21.

C. *1-methyl-3-(2-isopropylamino-1-hydroxyethyl)-indole*

A solution of 6.9 grams (0.03 mole) of 1-methyl-N-isopropyl-3-indoleglyoxylamide and 100 milliliters tetrahydrofuran was added during two hours to a refluxing mixture of 5.0 grams (0.135 mole) lithium aluminum hydride and 200 milliliters of tetrahydrofuran. The mixture was refluxed for two additional hours and 250 milliliters of tetrahydrofuran was removed. The residue was cooled, diluted with wet ether, and twenty milliliters of dilute sodium hydroxide solution was added. The mixture was filtered and the solid washed with ether. The combined filtrates were dried over magnesium sulfate and concentrated. The residue was twice recrystallized from ethyl acetate to yield 2.5 grams (35.7 percent) of 1-methyl-3-(2-isopropylamino-1-hydroxyethyl)-indole which melted at 114.5–115.5 degrees centigrade.

*Analysis.*—Calcd. for $C_{14}H_{20}N_2O$: C, 72.38; H, 8.67; N, 12.06. Found: C, 72.63; H, 8.32; N, 11.88.

EXAMPLE 16.—PREPARATION OF 1-METHYL-2-PHENYL-3-(2-PIPERIDINO-1-HYDROXYETHYL)-INDOLE

A. *1-methyl-2-phenyl-3-indoleglyoxylyl chloride*

In the same manner as disclosed in Example 15, part A, 1-methyl-2-phenyl-3-indoleglyoxylyl chloride was prepared by employing 1-methyl-2-phenylindole as the starting compound instead of 1-methylindole.

B. *1-methyl-2-phenyl-3-indoleglyoxylic acid piperidide*

To a solution of 14.8 grams (0.05 mole) of 1-methyl-2-phenyl-3-indoleglyoxylyl chloride in 200 milliliters of dry benzene was added thirteen grams (0.15 mole) of piperidine. Vigorous reaction ensued and a precipitate thereupon separated. After standing for 72 hours the mixture was filtered and the filtrate concentrated. The remaining solid was recrystallized from isopropanol to yield 16.4 grams of 1-methyl-2-phenyl-3-indoleglyoxylic acid piperidide which melted at 159–160 degrees centigrade.

*Analysis.*—Calcd. for $C_{22}H_{22}N_2O_2$: C, 76.27; H, 6.40; N, 8.08. Found: C, 76.44; H, 6.22; N, 8.26.

C. *1-methyl-2-phenyl-3-(2-piperidino-1-hydroxyethyl)-indole*

Nine grams (0.026 mole) of 1-methyl-2-phenyl-3-indoleglyoxylic acid piperidide was dissolved in 100 milliliters of tetrahydrofuran and the resulting solution was added to five grams (0.135 mole) of lithium aluminum hydride in 100 milliliters of the same solvent. The mixture was refluxed for three hours and cooled in an ice-bath. The mixture was treated with 500 milliliters of U. S. P. ether and fifty milliliters of ten percent sodium hydroxide solution. The solvent layer was decanted and the alkali layer washed with several 100-milliliter portions of ether. The combined solvents were concentrated under reduced pressure. The residue crystallized and was recrystallized several times from ethyl acetate. The product, 1 - methyl-2-phenyl-3-(2-piperidino-1-hydroxyethyl)-indole, melted at 154.5–156 degrees centigrade.

*Analysis.*—Calcd. for $C_{22}H_{26}N_2O$: C, 79.01; H, 7.83; N, 8.37. Found: C, 79.01; H, 7.70; N, 8.29.

EXAMPLE 17.—PREPARATION OF 1-METHYL-3-(2-AMINO-1-HYDROXYETHYL)-INDOLE

In the same manner as disclosed in Example 15, 1-methyl-3-indoleglyoxylyl chloride was prepared and reacted with ammonia instead of isopropylamine to produce 1-methyl-3-indoleglyoxylamide, and the latter was reduced with lithium aluminum hydride to produce 1-methyl-3-(2-amino-1-hydroxyethyl)-indole.

EXAMPLE 18.—PREPARATION OF 1-BENZYL-3-(2-ETHYL-AMINO-1-HYDROXYETHYL)-INDOLE

In the same manner as disclosed in Example 15, 1-benzyl-3-indoleglyoxylyl chloride was prepared by utilizing 1-benzylindole instead of 1-methylindole. The thus-produced compound was reacted with ethylamine instead of isopropylamine to produce 1-benzyl-N-ethyl-3-indoleglyoxylamide, and the latter was reduced with lithium aluminum hydride to produce 1-benzyl-3-(2-ethylamino-1-hydroxyethyl)-indole.

EXAMPLE 19.—PREPARATION OF 1,2-DIETHYL-3-(2-DI-BUTYLAMINO-1-HYDROXYETHYL)-INDOLE

In the same manner as disclosed in Example 1, part C, 1,2-diethylindole was prepared by reacting 2-ethylindole with ethyl iodide in lieu of N-methyl-3-indoleglyoxylamide and methyl iodide, and the thus-produced compound was reacted with oxalyl chloride to produce 1,2-diethyl-3-indoleglyoxylyl chloride. The 1,2-diethyl-3-indoleglyoxylyl chloride was reacted with dibutylamine to produce 1,2-diethyl-N,N-dibutyl-3-indoleglyoxylamide, and the latter was reduced with lithium aluminum hydride to produce 1,2-diethyl-3-(2-dibutylamino-1-hydroxyethyl)-indole.

EXAMPLE 20.—PREPARATION OF 1-HEXYL-6-BENZYLOXY-3-(2-BENZYLAMINO-1-HYDROXYETHYL)-INDOLE

In the same manner as disclosed in Example 1, part C, 1-hexyl-6-benzyloxyindole was prepared by reacting 6-benzyloxyindole with hexyl iodide in lieu of N-methyl-3-indoleglyoxylamide and methyl iodide.

In the same manner as disclosed in Example 15, part A, 1-hexyl-6-benzyloxy-3-indoleglyoxylyl chloride was prepared by reacting oxalyl chloride and 1-hexyl-6-benzyloxyindole. The resulting compound was reacted with benzylamine to produce 1-hexyl-6-benzyloxy-N-benzyl-3-indoleglyoxylamide, and the latter was reduced with lithium aluminum hydride to produce 1-hexyl-6-benzyloxy-3-(2-benzylamino-1-hydroxyethyl)-indole.

EXAMPLE 21.—PREPARATION OF 1,2-DIPROPYL-6-(PARA,PARA'-DIMETHYLBENZHYDRYLOXY)-3-(2-BUTYLAMINO-1-HYDROXYETHYL)-INDOLE 4-hydroxy-2-nitrobenzaldehyde was refluxed with diparatolylbromomethane [J. Am. Chem. Soc. 55, 2135 (1933)] and sodium ethoxide in absolute ethanol to produce 4-(para,para'-dimethylbenzhydryloxy)-2-nitrobenzaldehyde. The thus-produced compound was condensed with 1-nitrobutane in ethanol and water in the presence of sodium hydroxide at about minus fifteen degrees centigrade. The mixture was acidified with acetic acid, and the resulting product, 4-(para,para'-dimethylbenzhydryloxy)-2-nitro-α-[1-(1-nitrobutyl)]-benzyl alcohol, was removed by filtration and dehydrated with acetic anhydride at about eighty degrees centigrade. The resulting 4-(para,para'-dimethylbenzhydryloxy)-β,2-dinitro-β-propylstyrene was reductively cyclized with powdered iron in acetic acid at about 85 degrees centigrade to produce 2-propyl-6-(para,para'-dimethylbenzhydryloxy-indole.

In the same manner as shown in Example 1, part C, 1,2-dipropyl-6-(para,para'-dimethylbenzhydryloxy)-indole was prepared by reacting 2-propyl-6-(para,para'-dimethylbenzhydryloxy)-indole with propyl iodide in lieu of N-methyl-3-indoleglyoxylamide and methyl iodide.

In the same manner as disclosed in Example 15, part A, 1,2-dipropyl-6-(para,para'-dimethylbenzhydryloxy)-3-indoleglyoxylyl chloride was prepared by reacting oxalyl chloride and 1,2-dipropyl-6-(para,para'-dimethylbenzhydryloxy)-indole. The resulting compound was reacted with butylamine to produce 1,2-dipropyl-6-(para,para'-dimethylbenzhydryloxy)-N-butyl-3-indoleglyoxylamide, and the latter was reduced with lithium aluminum hydride to produce 1,2-dipropyl-6-(para,para'-dimethylbenzhydryloxy)-3-(2-butylamino-1-hydroxyethyl-indole.

EXAMPLE 22.—PREPARATION OF 1-(PARA-METHOXYBENZYL)-5-(PARA-METHOXYBENZYLOXY)-3-(2-DIMETHYLAMINO-1-HYDROXYETHYL)-INDOLE

In the same manner as shown in Example 21, 1-(para-methoxybenzyl)-5-(para-methoxybenzyloxy)-indole was prepared by reacting 5-hydroxy-2-nitrobenzaldehyde with 4-methoxybenzyl chloride to produce 5-(para-methoxybenzyloxy)-2-nitrobenzaldehyde, condensing the 5-(para-methoxybenzyloxy-2-nitrobenzaldehyde with nitromethane, dehydrating the resulting benzyl alcohol, reductively cyclizing the thus-produced 5-(para-methoxybenzyloxy)-β,2-dinitrostyrene to produce 5-(para-methoxybenzyloxy)-indole, and reacting the thus-produced indole with 4-methoxybenzyl chloride.

In the same manner as disclosed in Example 15, part A, 1-(para-methoxybenzyl)-5-(para-methoxybenzyloxy)-3-indoleglyoxylyl chloride was prepared by reacting oxalyl chloride and 1-(para-methoxybenzyl)-5-(para-methoxybenzyloxy)-indole. The resulting compound was reacted with dimethylamine to produce 1-(para-methoxybenzyl-5-(para-methoxybenzyloxy)-N,N-dimethyl-3-indoleglyoxylamide, and the latter was reduced with lithium aluminum hydride to produce 1-(para-methoxybenzyl)-5-(para-methoxybenzyloxy)-3-(2-dimethylamino-1-hydroxyethyl)-indole.

EXAMPLE 23.—PREPARATION OF 1,2-DIOCTYL-6-(PARA-METHYLBENZYLOXY)-3-(2-ANILINO-1-HYDROXYETHYL)-INDOLE

In the same manner as shown in Example 21, 2,2-dioctyl-6-(para-methylbenzyloxy)-indole was prepared by reacting 4-hydroxy-2-nitrobenzaldehyde with ω-chloro-p-xylene to produce 4-para-methylbenzyloxy)-2-nitrobenzaldehyde, condensing the 4-(para-methylbenzyloxy)-2-nitrobenzaldehyde with 1-nitrononane, dehydrating the resulting benzyl alcohol, reductively cyclizing the thus-produced 4-(para-methylbenzyloxy)-β,2-dinitro-β-octylstyrene to produce 2-octyl-6-(para-methylbenzyloxy)-indole, and reacting the thus-produced indole with 1-chlorooctane.

In the same manner as disclosed in Example 15, part A, 1,2-dioctyl-6-(para-methylbenzyloxy)-3-indoleglyoxylyl chloride was prepared by reacting oxalyl chloride and 1,2-dioctyl-6-(para-methylbenzyloxy)-indole. The resulting compound was reacted with aniline to produce 1,2-dioctyl-6-(para-methylbenzyloxy)-N-phenyl-3-indoleglyoxylamide, and the latter was reduced with lithium aluminum hydride to produce 1,2-dioctyl-6-(para-methylbenzyloxy)-3-(2-anilino-1-hydroxyethyl)-indole.

EXAMPLE 24.—PREPARATION OF 1-(PARA-CHLOROBENZYL)-6-(PARA-CHLOROBENZYLOXY)-3-(2-PROPYLAMINO-1-HYDROXYETHYL)-INDOLE

In the same manner as shown in Example 21, 1-(para-chlorobenzyl)-6-(para-chlorobenzyloxy)-indole was prepared by reacting 4-hydroxy-2-nitrobenzaldehyde with 4-chlorobenzyl bromide to produce 4-(para-chlorobenzyloxy)-2-nitrobenzaldehyde, condensing the 4-(para-chlorobenzyloxy)-2-nitrobenzaldehyde with nitromethane, dehydrating the resulting benzyl alcohol, reductively cyclizing the thus produced 4-(para-chlorobenzyloxy)-β,2-dinitrostyrene to produce 6-(para-chlorobenzyloxy)-indole, and reacting the thus-produced indole with 4-chlorobenzyl bromide.

In the same manner as disclosed in Example 15, part A, 1-(para-chlorobenzyl)-6-(para-chlorobenzyloxy)-3-indoleglyoxylyl chloride was prepared by reacting oxalyl chloride and 1-(para-chlorobenzyl)-6-(para-chlorobenzyloxy)-indole. The resulting compound was reacted with propylamine to produce 1-(para-chlorobenzyl-6-(para-chlorobenzyloxy)-N-propyl-3-indoleglyoxylamide, and the latter was reduced with lithium aluminum hydride to produce 1-(para-chlorobenzyl)-6-(para-chlorobenzyloxy)-3-(2-propylamino-1-hydroxyethyl)-indole.

EXAMPLE 25.—PREPARATION OF 1-ETHYL-2-PHENYL-5-ETHOXY-3-(2-HEXAMETHYLENEIMINO-1-HYDROXYETHYL)-INDOLE

In the same manner as disclosed in Example 15, part A, 1-ethyl-2-phenyl-5-ethoxy-3-indoleglyoxylyl chloride was prepared by reacting oxalyl chloride with 1-ethyl-2-phenyl-5-ethoxyindole (J. Chem. Soc. 1944, 670). The resulting compound was reacted with hexamethyleneimine to produce 1-ethyl-2-phenyl-5-ethoxy-N-hexamethylene-3-indoleglyoxylamide, and the latter was reduced with lithium aluminum hydride to produce 1-ethyl- 2-phenyl-5-ethoxy-3-(2-hexamethyleneimino - 1 - hydroxyethyl)-indole.

EXAMPLE 26.—PREPARATION OF 1-(PARA-METHYLBENZYL)-5,6-DIHYDROXY-3-(2- BENZYLMETHYLAMINO-1-HYDROXY)-INDOLE

In the same manner as shown in Example 21, 1-(paramethylbenzyl) - 5,6-diacetoxy-3-indoleglyoxylyl chloride was prepared by reacting ω-chloro-p-xylene with 5,6-diacetoxyindole (J. Chem. Soc. 1948, 2223) and reacting the thus-produced 1-(para-methylbenzyl)-5,6-diacetoxyindole with oxalyl chloride. The resulting compound was reacted with benzylmethylamine to produce 1-(para-methylbenyl) - 5,6-diacetoxy-N-benzyl-N-methyl-3-indoleglyoxylamide, and the latter was reduced with lithium aluminum hydride to produce 1-(para-methylbenzyl)-5,6-dihydroxy-3(2-benzylmethylamino - 1 - hydroxyethyl)-indole.

EXAMPLE 27.—PREPARATION OF 1-PHENETHYL-2-PHENYL-5-CHLORO-3-(2-METHYLAMINO-1- HYDROXYETHYL) - INDOLE

In the same manner as shown in Example 21, 1-phenethyl-2-phenyl-5-chloro - 3 - indoleglyoxylyl chloride was prepared by reacting 2-phenyl-5-chloroindole (J. Chem. Soc. 1948, 847) and β-phenethyl chloride to produce 1-phenethyl-2-phenyl-5-chloroindole and reacting the thus-produced compound with oxalyl chloride. The 1-phenethyl-2-phenyl-5-chloro-3-indoleglyoxylyl chloride was reacted with methylamine to produce 1-phenethyl-2-phenyl-5-chloro-N-methyl-3-indoleglyoxylamide, and the latter was reduced with lithium aluminum hydride to produce 1-phenethyl-2-phenyl-5-chloro-3(2-methylamino - 1 - hydroxyethyl)-indole.

EXAMPLE 28.—PREPARATION OF 1-(PARA-METHYLBENZYL)-2-PROPYL-6-AMINOMETHYL-3-(2-BENZYLAMINO-1-HYDROXYETHYL)-INDOLE

In the same manner as shown in Example 21, 1-(para-methylbenzyl)-2-propyl-6-cyanoindole was prepared by condensing 4-cyano-2-nitrobenzaldehyde (J. Chem. Soc. 1946, 567) with 1-nitrobutane, dehydrating the resulting benzyl alcohol, reductively cyclizing the thus-produced 4-cyano-β,2-dinitro-β-propylstyrene to produce 2-propyl-6-cyanoindole, and reacting the thus-produced indole with ω-chloro-p-xylene.

In the same manner as disclosed in Example 15, part A, 1-(para-methylbenzyl)-2-propyl-6-cyano - 3 - indoleglyoxylyl chloride was prepared by reacting oxalyl chloride and 1-(para-methylbenzyl)-2-propyl-6-cyanoindole. The resulting compound was reacted with benzylamine to produce 1-(para-methylbenzyl)-2-propyl - 6 - cyano-N-benzyl-3-indoleglyoxylamide, and the latter was reduced with lithium aluminum hydride to produce 1-(para-methylbenzyl)-2-propyl-6-aminomethyl - 3 - (2-benzylamino-1-hydroxyethyl)-indole.

EXAMPLE 29.—PREPARATION OF 1-DECYL-4-METHYLOL-3-(2-PIPERIDINO-1-HYDROXYETHYL)-INDOLE

In the same manner as shown in Example 21, 1-decyl-4-carbomethoxyindole was prepared by condensing 6-carbomethoxy-2-nitrobenzaldehyde (Monat. 24, 838) with nitromethane, dehydrating the resulting benzyl alcohol, reductively cyclizing the thus-produced 6-carbomethoxy-β,2-dinitrostyrene to produce 4-carbomethoxyindole, and reacting the thus-produced indole with 1-chlorodecane.

In the same manner as disclosed in Example 15, part A, 1-decyl-4-carbomethoxy-3-indoleglyoxylyl chloride was prepared by reacting oxalyl chloride and 1-decyl-4-carbomethoxyindole. The resulting compound was reacted with piperidine to produce 1-decyl-4-carbomethoxy-3-indoleglyoxylic acid piperidide, and the latter was reduced with lithium aluminum hydride to produce 1-decyl-4-methylol-3-(2-piperidino-1-hydroxyethyl)-indole.

EXAMPLE 30.—PREPARATION OF 1-PHENETHYL-2-ETHYL-6-METHYLOL-3-(2-PROPYLAMINO - 1 - HYDROXYETHYL)-INDOLE

In the same manner as shown in Example 21, 1-phenethyl-2-ethyl-6-carboxyindole was prepared by condensing 4-carboxy-2-nitrobenzaldehyde (Ann. 231, 368) with 1-nitropropane, dehydrating the resulting benzyl alcohol, reductively cyclizing the thus produced 4-carboxy-β,2-dinitro-β-ethylstyrene to produce 2-ethyl-6-carboxyindole and reacting the thus produced indole with β-phenethyl chloride.

In the same manner as disclosed in Example 15, part A, 1-phenethyl-2-ethyl-6-carboxy-3-indoleglyoxylyl chloride was prepared by reacting oxalyl chloride and 1-phenethyl-2-ethyl-6-carboxyindole. The resulting compound was reacted with propylamine to produce 1-phenethyl-2-ethyl-6-carboxy-N-propyl-3-indoleglyoxylamide, and the latter was reduced with lithium aluminum hydride to produce 1-phenethyl - 2 - ethyl-6-methylol-3-(2-propylamino-1-hydroxyethyl)-indole.

EXAMPLE 31.—PREPARATION OF 1-OCTYL-6-DIMETHYLAMINO-3-(2-DIETHYLAMINO-1-HYDROXYETHYL)-INDOLE 6-dimethylaminoindole was prepared by reacting 6-aminoindole [J. Am. Chem. Soc. 76, 5149–50 (1954)] with dimethyl sulfate in dilute aqueous sodium hydroxide solution.

In the same manner as disclosed in Example 21, 6-dimethylaminoindole was reacted with 1-chlorooctane to produce 1-octyl-6-dimethylaminoindole and the latter compound was reacted with oxalyl chloride to produce 1-octyl-6-dimethylamino-3-indoleglyoxylyl chloride. The resulting compound was reacted with diethylamine to produce 1 - octyl-6-dimethylamino-N,N-diethyl-3-indoleglyoxylamide, and the latter was reduced with lithium aluminum hydride to produce 1-octyl-6-dimethylamino-3-(2-diethylamino-1-hydroxyethyl)-indole.

EXAMPLE 32.—PREPARATION OF 1-ETHYL-2-PHENYL-5-METHYL-3-(2-ANILINO-1-HYDROXYETHYL)-INDOLE

In the same manner as disclosed in Example 15, part A, 1-ethyl-2-phenyl-5-methyl-3-indoleglyoxylyl chloride was prepared by reacting oxalyl chloride with 1-ethyl-2-phenyl-5-methylindole (J. Chem. Soc. 1943, 58). The resulting compound was reacted with aniline to produce 1-ethyl-2-phenyl-5-methyl-N-phenyl-3-indoleglyoxylamide, and the latter was reduced with lithium aluminum hydride to produce 1-ethyl-2-phenyl-5-methyl-3-(2-anilino-1-hydroxyethyl)-indole.

EXAMPLE 33.—PREPARATION OF 1-BENZYL-2,5-DIPHENYL-3-(2-BENZYLAMINO-1-HYDROXYETHYL)-INDOLE

In the same manner as shown in Example 21, 1-benzyl-2,5-diphenylindole was prepared by reacting 2,5-diphenylindole [J. Org. Chem. 2, 235 (1937)] with benzyl chloride. 1-benzyl-2,5-diphenyl-3-indoleglyoxylyl chloride was prepared by reacting oxalyl chloride with 1-benzyl-2,5-diphenylindole. The resulting compound was reacted with benzylamine to produce 1,N-dibenzyl-2,5-diphenyl-3-indoleglyoxylamide, and the latter was reduced with lithium aluminum hydride to produce 1-benzyl-2,5-diphenyl-3-(2-benzylamino-1-hydroxyethyl)-indole.

EXAMPLE 34.—PREPARATION OF 1-ETHYL-1-BENZ-(G)-3-(2-DIETHYLAMINO-1-HYDROXYETHYL)-INDOLE

In the same manner as shown in Example 21, 1-ethyl-1-benz-(g)-indole was prepared by reacting ethyl chloride and 1-benz-(g)-indole (J. Chem. Soc. 1951, 2462).

In the same manner as disclosed in Example 15, part A, 1 - ethyl - 1 - benz - (g) - 3 - indoleglyoxylyl chloride was prepared by reacting oxalyl chloride with 1 - ethyl - 1-benz-(g)-indole. The resulting compound was reacted with diethylamine to produce 1,N,N - triethyl - 1 - benz-(g) - 3 - indoleglyoxylamide, and the latter was reduced with lithium aluminum hydride to produce 1-ethyl-1-benz-(g)-3-(2-diethylamino-1-hydroxyethyl)-indole.

EXAMPLE 35.—PREPARATION OF 1-DECYL-5-PHENOXY-3-(2-CYCLOHEXYLAMINO-1-HYDROXYETHYL)-INDOLE

The para-phenoxyphenylhydrazone of pyruvic acid, prepared by condensing pyruvic acid and para-phenoxyphenylhydrazine [J. Am. Chem. Soc. 70, 1381 (1948)], was heated with zinc chloride via the Fischer indole synthesis to produce 5-phenoxyindole. The resulting compound was reacted with 1-chlorodecane to produce 1-decyl-5-phenoxyindole.

In the same manner as disclosed in Example 15, part A, 1 - decyl - 5 - phenoxy - 3 - indoleglyoxylyl chloride was prepared by reacting oxalyl chloride with 1-decyl-5-phenoxyindole. The resulting compound was reacted with cyclohexylamine to produce 1 - decyl - 5 - phenoxy - N - cyclohexyl - 3 - indoleglyoxylamide, and the latter was reduced with lithium aluminum hydride to produce 1-decyl - 5 - phenoxy - 3 - (2 - cyclohexylamino - 1 - hydroxyethyl) - indole.

EXAMPLE 36.—PREPARATION OF 1-ETHYL-2-PARA-BIPHENYLYL)-3-[2-(BENZYL-2-ETHYLHEXYLAMINO)-1-HYDROXYETHYL]-INDOLE

In the same manner as disclosed in Example 15, part A, oxalyl chloride was reacted with 1-ethyl-2-p-biphenylylindole (J. Chem. Soc. 1948, 847) to produce 1-ethyl-2-p-biphenylyl - 3 - indoleglyoxylyl chloride. The thus-produced compound was reacted with N-benzyl-2-ethylhexylamine, to produce 1-ethyl-2-(parabiphenylyl)-N-benzyl-N-(2-ethylhexyl-3-indoleglyoxylamide, and the latter was reduced with lithium aluminum hydride to produce 1-ethyl - 2 - (para-biphenylyl) - 3 - [2 - (benzyl - 2 - ethylhexylamino) - 1 - hydroxyethyl] - indole.

EXAMPLE 37.—PREPARATION OF 1-BENZYL-2-PHENYL-5,7-DICHLORO-3-(2-ANILINO-1-HYDROXYETHYL)-INDOLE

The 2,6-dichlorophenylhydrazone of acetophenone [J. Am. Chem. Soc. 70, 3422 (1948)] was heated with zinc chloride in the presence of nitrobenzene to produce 2-phenyl-5,7-dichloroindole. The latter compound was reacted with benzyl chloride to produce 1-benzyl-2-phenyl-5,7-dichloroindole.

In the same manner as disclosed in Example 15, part A, 1 - benzyl - 2 - phenyl - 5,7 - dichloro - 3 - indoleglyoxylyl chloride was prepared by reacting oxalyl chloride with 1 - benzyl - 2 - phenyl - 5,7 - dichloroindole. The resulting compound was reacted with aniline to produce 1-benzyl - 2 - phenyl - 5,7 - dichloro - N - phenyl - 3 - indoleglyoxylamide, and the latter was reduced with lithium aluminum hydride to produce 1 - benzyl - 2 - phenyl - 5,7 - dichloro - 3 - (2 - anilino - 1 - hydroxyethyl) - indole.

EXAMPLE 38.—PREPARATION OF 1,7-DIBENZYL-3-(2-METHYLAMINO-1-HYDROXYETHYL)-INDOLE 7-benzylindole was prepared by converting ortho-aminodiphenylmethane (J. Chem. Soc. 1945, 646) to ortho-hydrazinodiphenylmethane, utilizing the general procedure outlined in Organic Syntheses, collective volume 1, pages 442–445, and the orthohydrazinodiphenylmethane was condensed with ethyl pyruvate, utilizing the well known Fischer indole synthesis, to yield the ortho-benzylphenylhydrazone of ethyl pyruvate which was then cyclized, deesterified, and decarboxylated to yield 7-benzylindole.

In the same manner as shown in Example 21, 1,7-dibenzyl-3-indoleglyoxylyl chloride was prepared by reacting 7-benzylindole with benzyl chloride, and reacting oxalyl chloride with the resulting 1,7-dibenzylindole. The resulting compound was reacted with methylamine to produce 1,7 - dibenzyl - N - methyl - 3 - indoleglyoxylamide, and the latter compound was reacted with lithium aluminum hydride to produce 1,7 - dibenzyl - 3 - (2 - methylamino - 1 - hydroxyethyl) - indole.

EXAMPLE 39.—PREPARATION OF 1-PHENYL-3-[2-(2,2-DIMETHYLPYRROLIDINO)-1-HYDROXYETHYL]-INDOLE

In the same manner as shown in Example 15, part A, 1-phenyl-3-indoleglyoxylyl chloride was prepared by substituting 1-phenyl-indole (Shirley et al., loc. cit.) for 1-methylindole. The resulting compound was reacted with 2,2-dimethylpyrrolidine to produce 1-phenyl-3-indoleglyoxylic acid 2,2-dimethylpyrrolidide, which was reduced with lithium aluminum hydride to produce 1-phenyl-3-[2-(2,2-dimethylpyrrolidino)-1-hydroxyethyl]-indole.

EXAMPLE 40.—PREPARATION OF 1-ETHYL-3-(2-DIMETHYLAMINO-1-HYDROXYETHYL)-INDOLE 1-ethyl-N,N-dimethyl-3-indoleglyoxylamide (Example 5, part B) was suspended in ethanol and shaken under a hydrogen pressure of about fifty pounds in the presence of Adams' platinum oxide catalyst. When the hydrogen uptake halted the resulting mixture was heated and filtered. The ethanol was removed by distillation to yield 1-ethyl-N,N-dimethyl-3-indoleglycolamide.

In the same manner as shown in Example 5, part C, 1-ethyl-3-(2-dimethylamino-1-hydroxyethyl)-indole was obtained by reducing 1-ethyl-N,N-dimethyl-3-indoleglycolamide with lithium aluminum hydride.

EXAMPLE 41.—PREPARATION OF 1-ETHYL-3-(2-DIMETHYLAMINO-1-HYDROXYETHYL)-INDOLE METHOBROMIDE

To a solution of 0.20 gram of 1-ethyl-3-(2-dimethylamino-1-hydroxyethyl)-indole in 2.5 milliliters of anhydrous acetone was added 1.1 milliliters of cold methyl bromide. The mixture was kept in a tightly closed flask for two hours at room temperature, at which time a gum had precipitated. The mixture was maintained at minus fifteen degrees centigrade for 48 hours, the solvent was decanted and the gum was triturated with three milliliters of anhydrous ether. There was thus obtained 0.17 gram of 1 - ethyl - 3 - (2 - dimethylamino - 1 -hydroxyethyl)-indole methobromide whcih melted with decomposition between 178 and 185 degrees centigrade after sintering at slightly less than 90 degrees centigrade.

In the same manner other quaternary ammonium salts such as 1 - ethyl - 3 - (2 - dimethylamino - 1 - hydroxyethyl) - indole ethobromide, 1 - ethyl - 3 - (2 - dimethylamino - 1 - hydroxyethyl) - indole benzyl chloride are prepared by using ethyl bromide and benzyl chloride in lieu of methyl bromide.

Other salts which are produced by the present process include 1-methyl-3-(2-methylamino-1-hydroxyethyl)-indole pyruvate, 1-methyl-3-(2-benzyl-methylamino-1-hydroxyethyl)-indole trichloroacetate, 1-methyl-3-(2-dibenzylamino-1-hydroxyethyl)-indole dimethyl sulfate, 1-isopropyl-3-(2-dimethylamino-1-hydroxyethyl)-indole methyl para-toluenesulfonate, 1-butyl-3-(2-dimethylamino-1-hydroxyethyl)-indole ethobromide, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the preparation of 3-(2-amino-1-hydroxyethyl)-indole including salts thereof, the step of reducing with lithium aluminum hydride a compound having the formula:

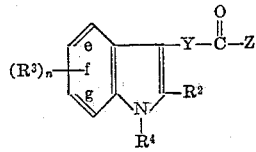

wherein $R^2$ is selected from the group consisting of hydrogen, aryl, aralkyl, and lower-alkyl, $n$ is an integer from zero to four, $R^3$ is selected from the group consisting of carboxy, cyano, dialkylamino, lower-carbalkoxy, halogen, lower-alkyl, aryl, aralkyl, aryloxy, lower-alkoxy, a benzyloxy, an acyloxy radical wherein the acyl substituent is from an organic carboxylic acid, and a fused arylene radical, R⁴ is selected from the group consisting of an alkyl, aryl, and an aralkyl radical, Z is an amido radical, and Y is selected from the group consisting of

and

to produce a 3-(2-amino-1-hydroxyethyl)-indole.

2. In a process the steps of reducing with lithium aluminum hydride a 3-indoleglyoxylamide having the formula:

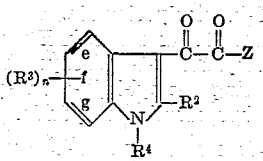

wherein R² is selected from the group consisting of hydrogen, aryl, aralkyl, and lower-alkyl, n is an integer from zero to four, R³ is selected from the group consisting of carboxy, cyano, dialkylamino, lower-carbalkoxy, halogen, lower-alkyl, aryl, aralkyl, aryloxy, lower-alkoxy, a benzyloxy, an acyloxy radical wherein the acyl substituent is from an organic carboxylic acid, and a fused arylene radical, R⁴ is selected from the group consisting of an alkyl, aryl, and an aralkyl radical, and Z is an amido radical to produce a 3-(2-amino-1-hydroxyethyl)-indole.

3. In a process the steps of reacting oxalyl halide with a indole having the formula:

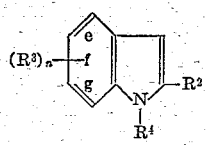

wherein R² is selected from the group consisting of hydrogen, aryl, aralkyl, and lower-alkyl, n is an integer from zero to four, R³ is selected from the group consisting of carboxy, cyano, dialkylamino, lower-carbalkoxy, halogen, lower-alkyl, aryl, aralkyl, aryloxy, lower-alkoxy, a benzyloxy, an acyloxy radical wherein the acyl substituent is from an organic carboxylic acid, and a fused arylene radical, and R⁴ is selected from the group consisting of an alkyl, aryl, and an aralkyl radical to produce a 3-indoleglyoxylyl halide, reacting the 3-indoleglyoxylyl halide with a compound selected from the group consisting of ammonia, a primary amine, and a secondary amine to produce a 3-indoleglyoxylylamide, and reducing the indoleglyoxylamide with lithium aluminum hydride to produce a 3-(2-amino-1-hydroxyethyl)-indole.

4. In a process the steps of reacting oxalyl halide with a 1-hydroindole having the formula:

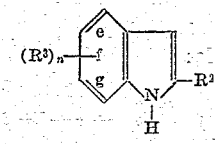

wherein R² is selected from the group consisting of hydrogen, aryl, aralkyl, and lower-alkyl, n is an integer from zero to four, R³ is selected from the group consisting of carboxy, cyano, dialkylamino, lower-carbalkoxy, halogen, lower-alkyl, aryl, aralkyl, aryloxy, lower-alkoxy, a benzyloxy, an acyloxy radical wherein the acyl substituent is from an organic carboxylic acid, and a fused arylene radical to produce a 1-hydro-3-indoleglyoxylyl halide, reacting the 1-hydro-3-indoleglyoxylyl halide with a compound selected from the group consisting of ammonia, a primary amine, and a secondary amine, to produce a 1-hydro-3-indoleglyoxylamide, reacting the 1-hydro-3-indoleglyoxylamide with a compound selected from the group consisting of an alkyl halide and an aralkyl halide in the presence of an alkali-metal alkoxide to produce a compound selected from the group consisting of 1-alkyl-3-indoleglyoxylamide and 1-aralkyl-3-indoleglyoxylamide, and reducing the compound thus produced with lithium aluminum hydride to produce a compound selected from the group consisting of 1-alkyl-3-(2-amino-1-hydroxyethyl)-indole and 1-aralkyl-3-(2-amino-1-hydroxyethyl)-indole.

5. A process for making 1-ethyl-3-(2-dimethylamino-1-hydroxyethyl)-indole which comprises the steps of reacting indole with oxalyl chloride to produce 3-indoleglyoxylyl chloride, reacting the thus-produced compound with dimethylamine to produce N,N-dimethyl-3-indoleglyoxylamide, converting the thus-produced amide to 1-ethyl-N,N-dimethyl-3-indoleglyoxylamide by reacting with ethyl iodide in the presence of sodium ethoxide, and reducing the 1-ethyl-N,N-dimethyl-3-indoleglyoxylamide with lithium aluminum hydride to produce 1-ethyl-3-(2-dimethylamino-1-hydroxyethyl)-indole.

6. In a process the step of reducing a 1-alkyl-3-indoleglyoxyl-amide with lithium aluminum hydride to produce a 1-alkyl-3-(2-amino-1-hydroxyethyl)-indole.

7. In a process the step of reducing a 1-aryl-3-indoleglyoxyl-amide with lithium aluminum hydride to produce a 1-aryl-3-(2-amino-1-hydroxyethyl)-indole.

8. In a process the step of reducing a 1-aralkyl-3-indoleglyoxyl-amide with lithium aluminum hydride to produce a 1-aralkyl-3-(2-amino-1-hydroxyethyl)-indole.

9. A process for making 1-ethyl-3-(2-dimethylamino-1-hydroxyethyl)-indole which comprises the step of reducing 1-ethyl-N,N-dimethyl-3-indoleglyoxylamide with lithium aluminum hydride.

10. A compound selected from the group consisting of (1) a 3-(2-amino-1-hydroxyethyl)-indole having the formula:

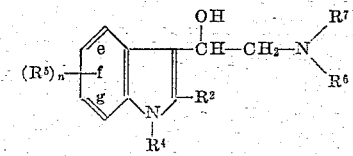

wherein R⁴ is a radical containing not more than 20 carbon atoms and is selected from the group consisting of an alkyl, an aryl, and an aralkyl radical, R² is a radical containing not more than 15 carbon atoms and is selected from the group consisting of hydrogen, aryl, aralkyl, and lower-alkyl, R⁵ is a radical containing not more than 15 carbon atoms and is selected from the group consisting of hydroxy, dialkylamino, methylol (CH₂OH), aminoethyl (CH₂NH₂), halogen, lower-alkyl, aryl, aralkyl, aryloxy, a fused arylene radical, a benzyloxy radical, and a lower-alkoxy radical, n is an integer from zero to four, and R⁶ and R⁷ are selected from the group consisting of hydrogen, aryl, aralkyl, and alkyl, and additional members of this series wherein R⁶ and R⁷ together with —N< form a heterocyclic amino radical, and (2) acid addition and quaternary ammonium salts thereof.

11. 1-alkyl-3-(2-dialkylamino-1-hydroxyethyl)-indole.

12. 1-ethyl - 3 - (2 - dimethylamino - 1-hydroxyethyl)-indole.

13. 1 - ethyl - 3 - (2 - dimethylamino-1-hydroxyethyl)-indole pyruvate.

14. 1 - ethyl - 3 - (2 - dimethylamino - 1 - hydroxyethyl) - indole trichloroactate.

15. 1 - ethyl - 3 - (2 - dimethylamino - 1 - hydroxyethyl)-indole hydrochloride.

16. 1 - methyl - 3 - (2 - dimethylamino - 1 - hydroxyethyl)-indole.

17. 1 - alkyl - 3 - (2 - alkylamino - 1 - hydroxyethyl)-indole.

18. 1 - methyl - 3 - (2 - methylamino - 1 - hydroxyethyl)-indole.

19. 1 - ethyl - 3 - (2 - methylamino - 1 - hydroxyethyl)-indole.

20. 1 - methyl - 3 - (2 - morpholino - 1 - hydroxyethyl)-indole.

21. 1 - ethyl - 3 - (2 - dimethylamino - 1 - hydroxyethyl)-indole methobromide.

References Cited in the file of this patent

UNITED STATES PATENTS 2,305,501    Spielman  ---------------- Dec. 15, 1942

OTHER REFERENCES

Jour. Org. Chem., vol. 16, pages 807 (1951).
Jour. Am. Chem. Soc., vol. 72, pages 3586–8 (1950).
The Chemistry of Heterocyclic Compounds (Indole and Carbozole) Sumpter et al., Interscience Publ. Inc., N. Y. (1954), pages 64 and 69.
Heterocyclic Compounds, vol. 3, Elderfield, John Wiley and Sons N. Y., pages 124 and 159 (1952).